United States Patent
Black

(10) Patent No.: US 11,003,906 B2
(45) Date of Patent: *May 11, 2021

(54) SCHEMES FOR RETRIEVING AND ASSOCIATING CONTENT ITEMS WITH REAL-WORLD OBJECTS USING AUGMENTED REALITY AND OBJECT RECOGNITION

(71) Applicant: Sony Interactive Entertainment Inc., Tokyo (JP)

(72) Inventor: Glenn Black, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/281,102

(22) Filed: Feb. 21, 2019

(65) Prior Publication Data

US 2019/0188472 A1    Jun. 20, 2019

Related U.S. Application Data

(63) Continuation of application No. 14/565,236, filed on Dec. 9, 2014, now Pat. No. 10,216,996.

(Continued)

(51) Int. Cl.
*G06K 9/00* (2006.01)
*G06K 9/62* (2006.01)
(Continued)

(52) U.S. Cl.
CPC ..... *G06K 9/00624* (2013.01); *G06K 9/00214* (2013.01); *G06K 9/00671* (2013.01);
(Continued)

(58) Field of Classification Search
None
See application file for complete search history.

(56) References Cited

U.S. PATENT DOCUMENTS

| 7,073,129 B1 | 7/2006 | Robarts |
| 7,800,646 B2 | 9/2010 | Martin |

(Continued)

FOREIGN PATENT DOCUMENTS

| CN | 1160580 | 8/2004 |
| CN | 102177512 | 9/2011 |

(Continued)

OTHER PUBLICATIONS

"AroundMe", AroundMe, archive of Jun. 22, 2011 http://www.aroundmeapp.com/, pp. 1-2.

(Continued)

*Primary Examiner* — James A Thompson
(74) *Attorney, Agent, or Firm* — Fitch, Even, Tabin & Flannery LLP

(57) ABSTRACT

A method includes identifying a real-world object in a scene viewed by a camera of a user device, matching the real-world object with a tagged object based at least in part on image recognition and a sharing setting of the tagged object, the tagged object having been tagged with a content item, providing a notification to a user of the user device that the content item is associated with the real-world object, receiving a request from the user for the content item, and providing the content item to the user. A computer readable storage medium stores one or more computer programs, and an apparatus includes a processor-based device.

20 Claims, 5 Drawing Sheets

Related U.S. Application Data

(60) Provisional application No. 62/057,219, filed on Sep. 29, 2014, provisional application No. 62/057,223, filed on Sep. 29, 2014.

(51) Int. Cl.
  *G06T 11/60* (2006.01)
  *G06T 19/00* (2011.01)
  *G06K 9/46* (2006.01)

(52) U.S. Cl.
  CPC ............ *G06K 9/6201* (2013.01); *G06T 11/60* (2013.01); *G06T 19/006* (2013.01); *G06K 9/00664* (2013.01); *G06K 9/4604* (2013.01); *G06K 9/4619* (2013.01); *G06K 9/4647* (2013.01); *G06T 2219/004* (2013.01)

(56) References Cited

U.S. PATENT DOCUMENTS

| | | |
|---|---|---|
| 7,853,296 B2 | 12/2010 | Yu |
| 8,194,940 B1 | 6/2012 | Kiyohara |
| 8,270,684 B2 | 9/2012 | Kiyohara |
| 8,341,145 B2 | 12/2012 | Dodson |
| 8,743,145 B1 | 6/2014 | Price |
| 8,798,401 B1 | 8/2014 | Johnson |
| 9,020,918 B2 | 4/2015 | Ikenoue |
| 9,275,499 B2 | 3/2016 | Adhikari |
| 9,280,849 B2 | 3/2016 | Adhikari |
| 9,280,850 B2 | 3/2016 | Adhikari |
| 9,280,851 B2 | 3/2016 | Adhikari |
| 9,280,852 B2 | 3/2016 | Adhikari |
| 9,286,721 B2 | 3/2016 | Adhikari |
| 9,342,817 B2 | 5/2016 | Elliott |
| 9,342,927 B2 | 5/2016 | Adhikari |
| 9,910,866 B2 | 3/2018 | Sandberg |
| 10,191,616 B2 | 1/2019 | Choi |
| 10,216,996 B2 * | 2/2019 | Black ................ G06K 9/00624 |
| 2004/0212630 A1 | 10/2004 | Hobgood |
| 2006/0038833 A1 | 2/2006 | Mallinson |
| 2006/0232499 A1 | 10/2006 | Ebersole |
| 2008/0052349 A1 | 2/2008 | Lin |
| 2009/0054084 A1 | 2/2009 | Buhrke |
| 2009/0248300 A1 | 10/2009 | Dunko |
| 2010/0002941 A1 | 1/2010 | Fonseca |
| 2010/0034466 A1 | 2/2010 | Jing |
| 2010/0049585 A1 | 2/2010 | McIntyre |
| 2010/0050090 A1 | 2/2010 | Leebow |
| 2010/0179857 A1 | 7/2010 | Kalaboukis |
| 2010/0191827 A1 * | 7/2010 | Martin ................... G06Q 30/02 709/217 |
| 2010/0211898 A1 | 8/2010 | Bhojani |
| 2010/0232656 A1 * | 9/2010 | Ryu ...................... G06F 17/218 382/118 |
| 2010/0309225 A1 | 12/2010 | Gray |
| 2010/0325218 A1 | 12/2010 | Castro |
| 2011/0013810 A1 | 1/2011 | Engstrom |
| 2011/0052012 A1 | 3/2011 | Bambha |
| 2011/0064281 A1 | 3/2011 | Chan |
| 2011/0164163 A1 | 7/2011 | Bilbrey |
| 2011/0212717 A1 | 9/2011 | Rhoads |
| 2011/0234631 A1 | 9/2011 | Kim |
| 2011/0249144 A1 | 10/2011 | Chang |
| 2012/0001939 A1 | 1/2012 | Sandberg |
| 2012/0027256 A1 | 2/2012 | Kiyohara |
| 2012/0062595 A1 | 3/2012 | Oh |
| 2012/0113142 A1 | 5/2012 | Adhikari |
| 2012/0113143 A1 | 5/2012 | Adhikari |
| 2012/0113144 A1 | 5/2012 | Adhikari |
| 2012/0113145 A1 | 5/2012 | Adhikari |
| 2012/0113274 A1 | 5/2012 | Adhikari |
| 2012/0114297 A1 | 5/2012 | Adhikari |
| 2012/0116920 A1 | 5/2012 | Adhikari |
| 2012/0120101 A1 | 5/2012 | Adhikari |
| 2012/0157044 A1 * | 6/2012 | Kim ..................... G06F 21/84 455/410 |
| 2012/0210254 A1 | 8/2012 | Fukuchi |
| 2012/0233032 A1 | 9/2012 | Calman |
| 2012/0250950 A1 | 10/2012 | Papakipos |
| 2012/0290591 A1 | 11/2012 | Flynn |
| 2013/0013683 A1 | 1/2013 | Elliott |
| 2013/0066878 A1 * | 3/2013 | Flynn ..................... G06F 16/51 707/741 |
| 2013/0129142 A1 * | 5/2013 | Miranda-Steiner ......................... G06K 9/00664 382/103 |
| 2013/0135348 A1 | 5/2013 | Anzai |
| 2013/0194438 A1 | 8/2013 | Sweet, III |
| 2013/0222369 A1 * | 8/2013 | Huston .................. G06T 17/00 345/419 |
| 2014/0040828 A1 | 2/2014 | Choi |
| 2014/0044358 A1 | 2/2014 | Srinivasan |
| 2014/0078174 A1 | 3/2014 | Williams |
| 2014/0080428 A1 | 3/2014 | Rhoads |
| 2014/0245335 A1 | 8/2014 | Holden |
| 2014/0253743 A1 | 9/2014 | Loxam |
| 2015/0012365 A1 | 1/2015 | McIntyre |
| 2015/0013016 A1 | 1/2015 | Kanter |
| 2015/0103097 A1 | 4/2015 | Li |
| 2016/0092732 A1 | 3/2016 | Black |
| 2016/0093106 A1 | 3/2016 | Black |
| 2016/0240010 A1 | 8/2016 | Rosenthal |
| 2016/0261669 A1 | 9/2016 | Elliott |
| 2019/0220664 A1 | 7/2019 | Black |

FOREIGN PATENT DOCUMENTS

| | | |
|---|---|---|
| CN | 103069370 A | 4/2013 |
| CN | 103119595 | 5/2013 |
| CN | 103577102 A | 2/2014 |
| CN | 103620600 | 3/2014 |
| CN | 103635892 | 3/2014 |
| CN | 103797493 | 5/2014 |
| CN | 103870485 | 6/2014 |
| CN | 103635892 B | 10/2017 |
| CN | 107491701 A | 12/2017 |
| JP | 2002175315 | 6/2002 |
| JP | 2010509697 | 3/2010 |
| JP | 2010198604 | 9/2010 |
| JP | 2012500439 | 1/2012 |
| JP | 2012165276 | 8/2012 |
| JP | 2013105345 | 5/2013 |
| JP | 2013219666 | 10/2013 |
| JP | 6349031 | 6/2018 |
| KR | 20120002066 | 1/2012 |
| WO | 2013006584 | 1/2013 |

OTHER PUBLICATIONS

"Augmented Reality", Layar, archive of Sep. 4, 2013 https://www.layar.com/augmented-reality/, pp. 1-3.

"Layar revolutionizes Mobile Content Discovery with new Stream Technology powered browser" brochure, Layar, archive of Jun. 2, 2010 http://site.layar.com/company/blog/layar-revolutionizes-mobile-content-discovery/, pp. 1-6.

"The easiest way to add Augmented Reality in your app.", archive of Nov. 17, 2010 http://site.layar.com/company/blog/the-easiest-way-to-add-augmented-reality-in-your-app/, pp. 1-4.

"Tweakersoft", Tweakersoft, archive of Nov. 29, 2010 http://tweakersoft.com/, 1 page.

Belimpasakis, Petros., et al; "Enabling Rapid Creation of Content for Consumption in Mobile Augmented Reality", 2010 Fourth International Conference on Next Generation Mobile Applications, Services and Technologies (NGMAST 2010), Jul. 27-29, 2010, pp. 1-6.

Capin, Tolga, et al.; "The State of the Art in Mobile Graphics Research", IEEE Computer Graphics and Applications, vol. 28, No. 4, Jul./Aug. 2008, pp. 74-84.

Chinese Patent Office; "First Office Action" issued in Chinese Patent Application No. 201280033005.3, dated Sep. 30, 2015, 42 pages (includes English translation).

(56) References Cited

OTHER PUBLICATIONS

Chinese Patent Office; "Second Office Action" issued in Chinese Patent Application No. 201280033005.3, dated Aug. 8, 2016, 6 pages (includes English translation).
Chinese Patent Office; "Third Office Action" issued in Chinese Patent Application No. 201280033005.3, dated Feb. 28, 2017, 5 pages (includes English translation).
Chinese Patent Office; "Notification of the Decision to Grant a Patent Right for Patent for Invention" issued in Chinese Patent Application No. 201280033005.3, dated Jun. 29, 2017, 5 pages (includes English translation).
Constanza, Enrico, Kunz, Andrea, & Fjeld, Morten; "Mixed Reality: A Survey", appearing in Human Machine Interaction.vol. LNCS 5440. Berlin: Springer, May 2009. 47-68.
European Patent Office; "Communication Pursuant to Article 94(3) EPC" issued in European Patent Application No. 15845967.7, dated Feb. 27, 2019, 5 pages.
European Patent Office; "Communication Pursuant to Article 94(3) EPC" issued in European Patent Application No. 15847522.8, dated Feb. 27, 2019, 5 pages.
European Patent Office; "Invitation Pursuant to Rule 62a(1) EPC" issued in European Patent Application No. 15845967.7, dated Feb. 16, 2018, 2 pages.
European Patent Office; "Invitation Pursuant to Rule 62a(1) EPC" issued in European Patent Application No. 15847522.8, dated Feb. 22, 2018, 2 pages.
European Patent Office; "Extended European Search Report" issued in European Patent Application No. 15845967.7, dated Jun. 14, 2018, 10 pages.
European Patent Office; "Extended European Search Report" issued in European Patent Application No. 15847522.8, dated Jun. 13, 2018, 9 pages.
Gammeter, Stephan, et al.; "Server-side object recognition and client-side object tracking for mobile augmented reality", Computer Vision and Pattern Recognition Workshops (CVPRW), 2010 IEEE Computer Society Conference on. IEEE Jun. 13-18, 2010; pp. 1-8.
Gotow, J. Benjamin, et al.; "Addressing Challenges with Augmented Reality Applications on Smartphones", Mobile Wireless Middleware, Operating Systems, and Applications, Lecture Notes of the Institute for Computer Sciences, Social Informatics and Telecommunications Engineering vol. 48, 2010, pp. 1-14.
Japanese Patent Office; "Decision to Grant a Patent" issued in Japanese Patent Application No. 2017-515783, dated Sep. 4, 2018, 3 pages.
Japanese Patent Office; "Decision to Grant a Patent" issued in Japanese Patent Application No. 2017-515779, dated May 8, 2018, 3 pages.
Japanese Patent Office; "Notification of Reason(s) for Refusal" issued in Japanese Patent Application No. 2017-515779, dated Jan. 23, 2018, 8 pages (includes English translation).
Japanese Patent Office; "Notification of Reason(s) for Refusal" issued in Japanese Patent Application No. 2017-515783, dated Mar. 6, 2018, 11 pages (includes English translation).
Klein, Georg, et al.; "Parallel Tracking and Mapping on a Camera Phone", 8th(IEEE) and (ACM) International Symposium on Mixed and Augmented Reality, 2009, pp. 1-4.
Patent Cooperation Treaty; "International Search Report" issued in corresponding PCT/US15/50908, dated Dec. 18, 2015; 2 pages.
Patent Cooperation Treaty; "International Search Report" issued in PCT Application No. PCT/US15/50870, dated Dec. 11, 2015; 2 pages.
Patent Cooperation Treaty; "International Search Report" issued in PCT/US12/45314, dated Sep. 24, 2012, 2 pages.
Patent Cooperation Treaty; "Notification of Transmittal of the International Search Report and the Written Opinion of the International Searching Authority, or the Declaration" issued in corresponding PCT/US15/50908, dated Dec. 18, 2015; 2 pages.
Patent Cooperation Treaty; "Notification of Transmittal of the International Search Report and the Written Opinion of the International Searching Authority, or the Declaration" issued in PCT Application No. PCT/US15/50870, dated Dec. 11, 2015; 1 page.
Patent Cooperation Treaty; "Written Opinion of the International Searching Authority" issued in corresponding PCT/US15/50908, dated Dec. 18, 2015; 8 pages.
Patent Cooperation Treaty; "Written Opinion of the International Searching Authority" issued in PCT Application No. PCT/US15/50870, dated Dec. 11, 2015; 10 pages.
Rosten, Edward, et al.; "Faster and better: a machine learning approach to corner detection", IEEE Trans. Pattern Analysis and Machine Intelligence, 2010, pp. 1-15.
Rosten, Edward, et al.; "Machine learning for high-speed corner detection", European Conference on Computer Vision, May 2006, pp. 1-14.
Takacs, Gabriel, et al.; "Outdoors Augmented Reality on Mobile Phone Using Loxel-Based Visual Feature Organization"; Proceedings of the 1st ACM International Conference on Multimedia Information Retrieval; ACM, 2008; pp. 427-434.
USPTO; Advisory Action, Applicant-Initiated Interview Summary, and After Final Consideration Pilot (AFCP 2.0) Decision issued in U.S. Appl. No. 14/565,204, dated Apr. 13, 2018, 8 pages.
USPTO; Final Office Action & Examiner-Initiated Interview Summary issued in U.S. Appl. No. 13/220,536, dated May 23, 2014, 19 pages.
USPTO; Final Office Action issued in U.S. Appl. No. 13/220,536, dated Apr. 1, 2015, 19 pages.
USPTO; Final Office Action issued in U.S. Appl. No. 13/220,536, dated May 31, 2013, 25 pages.
USPTO; Final Office Action issued in U.S. Appl. No. 14/565,204, dated Jan. 11, 2018, 18 pages.
USPTO; Final Office Action issued in U.S. Appl. No. 14/565,204, dated May 31, 2017, 23 pages.
USPTO; Final Office Action issued in U.S. Appl. No. 14/565,204, dated Sep. 9, 2016, 20 pages.
USPTO; Final Office Action issued in U.S. Appl. No. 14/565,236, dated Jan. 27, 2017, 20 pages.
USPTO; Final Office Action issued in U.S. Appl. No. 14/565,236, dated Oct. 2, 2017, 24 pages.
USPTO; Non-Final Office Action issued in U.S. Appl. No. 15/156,146, dated Oct. 2, 2018, 19 pages.
USPTO; Non-Final Office Action issued in U.S. Appl. No. 16/360,016, dated Apr. 15, 2019, 11 pages.
USPTO; Notice of Allowance and Fee(s) Due issued in U.S. Appl. No. 14/565,204, dated Apr. 3, 2019, 7 pages.
USPTO; Notice of Allowance and Fee(s) Due issued in U.S. Appl. No. 14/565,204, dated Aug. 27, 2018, 7 pages.
USPTO; Notice of Allowance and Fee(s) Due issued in U.S. Appl. No. 14/565,204, dated Dec. 3, 2018, 7 pages.
USPTO; Notice of Allowance and Fee(s) Due issued in U.S. Appl. No. 14/565,236, dated Oct. 12, 2018, 7 pages.
USPTO; Notice of Allowance issued in U.S. Appl. No. 14/565,204, dated May 2, 2018, 8 pages.
USPTO; Notice of Allowance issued in U.S. Appl. No. 14/565,236, dated Mar. 15, 2018, 8 pages.
USPTO; Notice of Allowance issued in U.S. Appl. No. 13/220,536, dated Jan. 7, 2016, 6 pages.
USPTO; Notice of Allowance issued in U.S. Appl. No. 14/565,236, dated Jul. 2, 2018, 7 pages.
USPTO; Office Action & Examiner-Initiated Interview Summary issued in U.S. Appl. No. 13/220,536, dated Jul. 27, 2015, 20 pages.
USPTO; Office Action issued in U.S. Appl. No. 13/220,536, dated Dec. 23, 2014, 18 pages.
USPTO; Office Action issued in U.S. Appl. No. 13/220,536, dated Jan. 17, 2013, 22 pages.
USPTO; Office Action issued in U.S. Appl. No. 13/220,536, dated Jan. 24, 2014, 21 pages.
USPTO; Office Action issued in U.S. Appl. No. 13/220,536, dated Sep. 24, 2013, 26 pages.
USPTO; Office Action issued in U.S. Appl. No. 14/565,204, dated Feb. 23, 2016, 19 pages.
USPTO; Office Action issued in U.S. Appl. No. 14/565,204, dated Feb. 7, 2017, 19 pages.

(56) References Cited

OTHER PUBLICATIONS

USPTO; Office Action issued in U.S. Appl. No. 14/565,204, dated Sep. 20, 2017, 20 pages.
USPTO; Office Action issued in U.S. Appl. No. 14/565,236, dated Aug. 22, 2016, 16 pages.
USPTO; Office Action issued in U.S. Appl. No. 14/565,236, dated Jun. 9, 2017, 21 pages.
USPTO; Pending U.S. Appl. No. 16/360,016, filed Mar. 21, 2019.
USPTO; U.S. Appl. No. 61/411,053, filed Nov. 8, 2010.
Van Krevelen, D.W.F. & Poelman, R.; "A Survey of Augmented Reality Technologies, Applications and Limitations"; The International Journal of Virtual Reality, vol. 9, No. 2. (Jun. 2010), pp. 1-19.
Wikipedia; "AroundMe", archive from May 6, 2010 of http://en.wikipedia.org/w.index.php?title=AroundMe&oldid=360610438, pp. 1-2.
European Patent Office; "Communication Pursuant to Article 94(3) EPC" issued in European Patent Application No. 15847522.8, dated Aug. 5, 2019, 5 pages.
European Patent Office; "Communication Pursuant to Article 94(3) EPC" issued in European Patent Application No. 15845967.7, dated Aug. 5, 2019, 5 pages.
USPTO; Notice of Allowance and Fee(s) Due issued in U.S. Appl. No. 14/565,204, dated Sep. 19, 2019, 4 pages.
Japanese Patent Office; "Notification of Reason(s) for Refusal" issued in Japanese Patent Application No. 2018-106021, dated Sep. 24, 2019, 11 pages (includes English translation).
U.S. Appl. No. 16/360,016, filed Mar. 21, 2019, entitled "Method and Apparatus for Recognition and Matching of Objects Depicted in Images."
European Patent Office; "Communication Pursuant to Article 94(3) EPC" issued in European Patent Application No. 15845967.7, dated Nov. 7, 2019, 5 pages.
USPTO; Supplemental Notice of Allowability issued in U.S. Appl. No. 14/565,204, dated Nov. 12, 2019, 4 pages.
USPTO; Final Office Action issued in U.S. Appl. No. 16/360,016, dated Nov. 21, 2019, 11 pages.
European Patent Office; "Communication Pursuant to Article 94(3) EPC" issued in European Patent Application No. 15847522.8, dated Nov. 19, 2019, 5 pages.
USPTO; Supplemental Notice of Allowability issued in U.S. Appl. No. 14/565,204, dated Dec. 26, 2019, 4 pages.
Chinese Patent Office; "The First Office Action" issued in Chinese Patent Application No. 201580051147.6, dated Dec. 4, 2019, 25 pages (includes English translation).
Chinese Patent Office; "The First Office Action" issued in Chinese Patent Application No. 201580051213.X, dated Dec. 12, 2019, 30 pages (includes English translation).
USPTO; Notice of Allowance and Fee(s) Due issued in U.S. Appl. No. 14/565,204, dated Feb. 3, 2020, 7 pages.
USPTO; Non-Final Office Action issued in U.S. Appl. No. 16/360,016, dated Mar. 24, 2020, 10 pages.
European Patent Office; "Communication under Rule 71(3) EPC Intention to Grant" issued in European Patent Application No. 15845967.7, dated Jun. 8, 2020, 33 pages.
U.S. Appl. No. 14/565,204, filed Dec. 9, 2014, U.S. Publication No. 2016/0092732 A1, entitled "Method and Apparatus for Recognition and Matching of Objects Depicted in Images,".
U.S. Appl. No. 62/057,219, filed Sep. 29, 2014 entitled "Schemes for Retrieving and Associating Content Items with Real-World Objects Using Augmented Reality and Object Recognition,".
U.S. Appl. No. 62/057,223, filed Sep. 29, 2014 entitled "Method and Apparatus for Recognition and Matching of Objects Depicted in Images,".
U.S. Appl. No. 14/565,236, filed Dec. 9, 2014, U.S. Publication No. 2016/0093106 A1, now U.S. Pat. No. 10,216,996, entitled "Schemes for Retrieving and Associating Content Items with Real-World Objects Using Augmented Reality and Object Recognition,".
U.S. Appl. No. 16/360,016, filed Mar. 21, 2019, U.S. Publication No. 2019/0220664 A1, entitled "Method and Apparatus for Recognition and Matching of Objects Depicted in Images,".
U.S. Appl. No. 16/903,240, filed Jun. 16, 2020, entitled "Schemes for Retrieving and Associating Content Items with Real-World Objects Using Augmented Reality and Object Recognition,".
USPTO; Supplemental Notice of Allowability issued in U.S. Appl. No. 14/565,204, dated Jul. 7, 2020, 4 pages.
European Patent Office; "Communication Pursuant to Article 94(3) EPC" issued in European Patent Application No. 15847522.8, dated Jun. 26, 2020, 7 pages.
Chinese Patent Office; "The Second Office Action" issued in Chinese Patent Application No. 201580051147.6, dated Jul. 15, 2020, 13 pages (includes English translation).
USPTO; Supplemental Notice of Allowability issued in U.S. Appl. No. 14/565,204, dated Aug. 20, 2020, 4 pages.
USPTO; Non-Final Office Action issued in U.S. Appl. No. 16/903,240, dated Aug. 31, 2020, 18 pages.
Chinese Patent Office; "The Second Office Action" issued in Chinese Patent Application No. 201580051213.X, dated Aug. 24, 2020, 34 pages (includes English translation).
China Radio Home; "Augmented reality app Stiktu: labeling the real world"; http://tech.cnr.cn/list/201206/t20120615_509921879.shtml; Jun. 15, 2012; 6 pages (includes English translation).
Gammeter, Stephan et al.; "I know what you did last summer: object-level auto-annotation of holiday snaps"; 2009 IEEE 12th International Conference on Computer Vision (ICCV); Jul. 29, 2010; pp. 614-621.
Zhu, Yihe; "Internet Scenic Spot Picture Mining and Reality Augmentation"; Full-text Database of China's Excellent Master's Thesis, Information Technology; dated Jan. 11, 2013; pp. 1-24 (includes English translation).
USPTO; Pending U.S. Appl. No. 16/903,240, filed Jun. 16, 2020.
USPTO; Supplemental Notice of Allowability issued in U.S. Appl. No. 14/565,204, dated Aug. 1, 2019, 4 pages.
European Patent Office; "Invitation pursuant to Rule 62a(1) EPC and Rule 63(1) EPC" issued in European Patent Application No. 20199900.0, dated Dec. 2, 2020, 3 pages.
Chinese Patent Office; "Notification of the Decision to Grant a Patent Right for Patent for Invention" issued in Chinese Patent Application No. 201580051147.6, dated Dec. 23, 2020, 5 pages (includes English translation).
USPTO; Notice of Allowance and Fee(s) Due issued in U.S. Appl. No. 14/565,204, dated Oct. 26, 2020, 7 pages.
European Patent Office; "Summons to attend oral proceedings pursuant to Rule 115(1) EPC" issued in European Patent Application No. 15847522.8, dated Jan. 12, 2021, 8 pages.
USPTO; Notice of Allowance and Fee(s) Due issued in U.S. Appl. No. 16/903,240, dated Jan. 25, 2021, 10 pages.
USPTO; Supplemental Notice of Allowability issued in U.S. Appl. No. 14/565,204, dated Feb. 9, 2021, 4 pages.
Chinese Patent Office; "Notification of the Decision to Grant a Patent Right for Patent for Invention" issued in Chinese Patent Application No. 201580051213.X, dated Jan. 29,2021, 5 pages (includes English translation).
European Patent Office; "Extended European Search Report" issued in European Patent Application No. 20199900.0, dated Mar. 5, 2021, 11 pages.
Murphy-Chutorian, Erik et al.; "Similar Images graduates from Google Labs"; Google Official Blog, https://googleblog.blogspot.com/2009/10/similar-images-graduates-from-google.html; dated Oct. 27, 2009; 3 pages.

\* cited by examiner

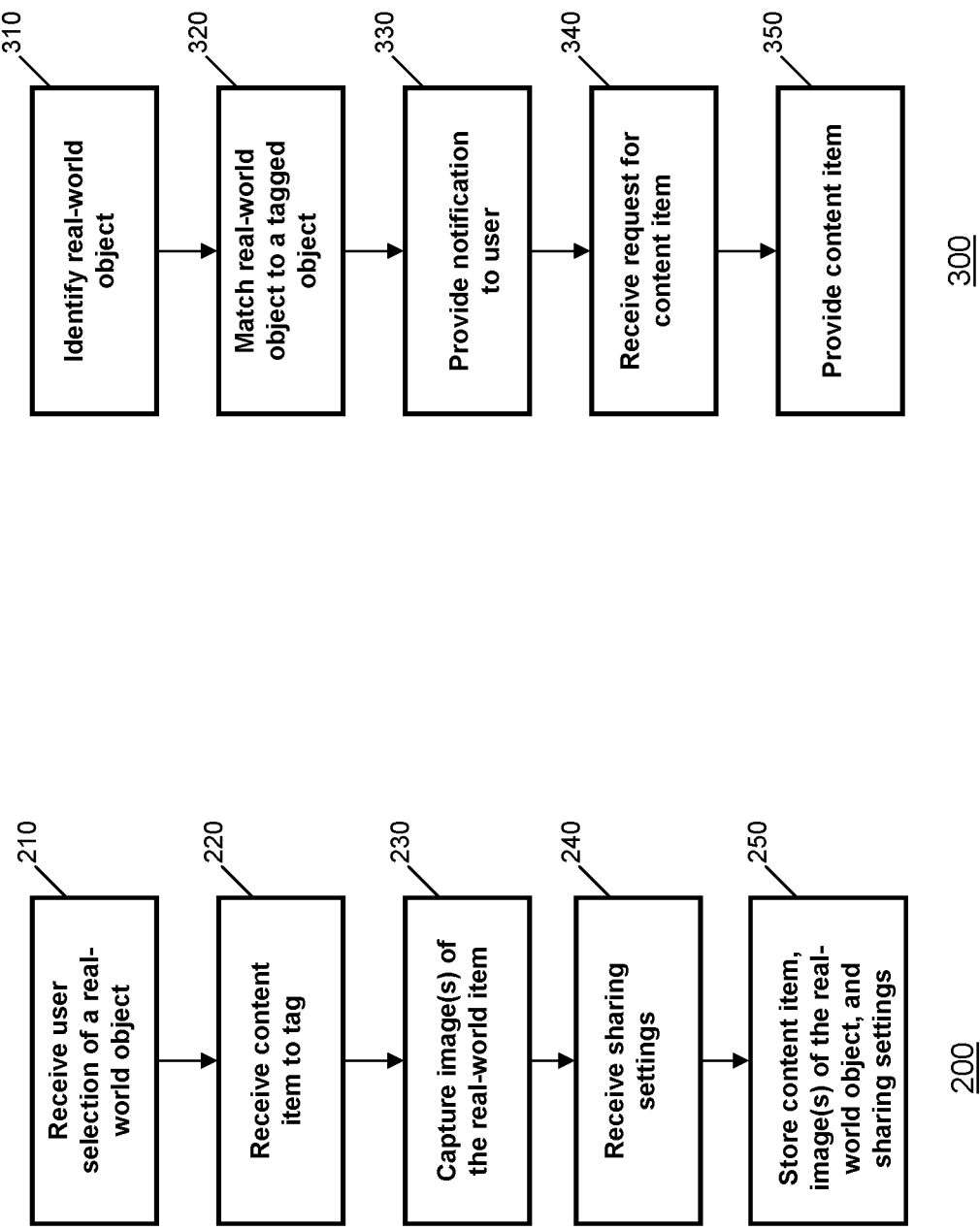

SCHEMES FOR RETRIEVING AND ASSOCIATING CONTENT ITEMS WITH REAL-WORLD OBJECTS USING AUGMENTED REALITY AND OBJECT RECOGNITION

CROSS-REFERENCE TO RELATED APPLICATIONS

This application is a continuation of U.S. patent application Ser. No. 14/565,236, filed on Dec. 9, 2014, entitled "SCHEMES FOR RETRIEVING AND ASSOCIATING CONTENT ITEMS WITH REAL-WORLD OBJECTS USING AUGMENTED REALITY AND OBJECT RECOGNITION," which claims the benefit of U.S. Provisional Patent Application No. 62/057,219, filed on Sep. 29, 2014, entitled "SCHEMES FOR RETRIEVING AND ASSOCIATING CONTENT ITEMS WITH REAL-WORLD OBJECTS USING AUGMENTED REALITY AND OBJECT RECOGNITION," and also claims the benefit of U.S. Provisional Patent Application No. 62/057,223, filed on Sep. 29, 2014, entitled "METHOD AND APPARATUS FOR RECOGNITION AND MATCHING OF OBJECTS DEPICTED IN IMAGES," the entire contents and disclosures of which are all hereby fully incorporated by reference herein in their entireties.

This application is related to U.S. patent application Ser. No. 14/565,204, filed on Dec. 9, 2014, entitled "METHOD AND APPARATUS FOR RECOGNITION AND MATCHING OF OBJECTS DEPICTED IN IMAGES", the entire disclosure of which is incorporated by reference herein in its entirety.

BACKGROUND OF THE INVENTION

1. Field of the Invention

The present invention relates generally to computer software applications, and more specifically to augmented reality apparatus and software.

2. Discussion of the Related Art

Augmented Reality (AR) is the general concept of modifying a view of reality with computer generated sensory input. While AR systems exist, they are mostly limited in application and content. For the most part, AR applications are single purpose programs that function to provide developer generated and controlled content to the user.

SUMMARY OF THE INVENTION

One embodiment provides a method, comprising: identifying a real-world object in a scene viewed by a camera of a user device; matching the real-world object with a tagged object based at least in part on image recognition and a sharing setting of the tagged object, the tagged object having been tagged with a content item; providing a notification to a user of the user device that the content item is associated with the real-world object; receiving a request from the user for the content item; and providing the content item to the user.

Another embodiment provides an apparatus comprising: a processor-based device; and a non-transitory storage medium storing a set of computer readable instructions configured to cause the processor-based device to perform steps comprising: identifying a real-world object in a scene viewed by a camera of a user device; matching the real-world object with a tagged object based at least in part on image recognition and a sharing setting of the tagged object, the tagged object having been tagged with a content item; providing a notification to a user of the user device that the content item is associated with the real-world object; receiving a request from the user for the content item; and providing the content item to the user.

Another embodiment provides a method, comprising: receiving a selection of a real-world object as viewed by a camera of a first user device from a user; receiving a content item to tag to the real-world object; capturing one or more images of the real-world object with the camera; receiving a sharing setting from the user, wherein the sharing setting comprises whether the real-world object will be matched only with an image of the real-world object or with an image of any object sharing one or more common attributes with the real-world object; and storing the content item, the one or more images of the real-world object, and the sharing setting on a server, wherein the content item is configured to be retrieved by a second user device viewing an object matching the real-world object.

Another embodiment provides an apparatus comprising: a processor-based device; and a non-transitory storage medium storing a set of computer readable instructions configured to cause the processor-based device to perform steps comprising: receiving a selection of a real-world object as viewed by a camera of a first user device from a user; receiving a content item to tag to the real-world object; capturing one or more images of the real-world object with the camera; receiving a sharing setting from the user, wherein the sharing setting comprises whether the real-world object will be matched only with an image of the real-world object or with an image of any object sharing one or more common attributes with the real-world object; and storing the content item, the one or more images of the real-world object, and the sharing setting on a server, wherein the content item is configured to be retrieved by a second user device viewing an object matching the real-world object.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein:

FIG. 2 is a diagram illustrating a method of virtually tagging a real-world object in accordance with some embodiments of the present invention;

FIG. 3 is a diagram illustrating a method of providing a content item tagged to a real-world object in accordance with some embodiments of the present invention;

DETAILED DESCRIPTION

Augmented Reality (AR) can be used to provide supplemental information about real-world objects for story telling. The following discussion will focus on example embodiments of the present invention that allow users to share stories based on real-world objects via an AR story telling system. In some embodiments, the AR story telling system provides users with a way to publish and share memories and stories about real-world objects with a great degree of customization and control. Specifically, in some embodiments a user can tag a real-world object with content items such as text, photo, video, and audio to share with other users. In some embodiments the system provides a user a notification when a real-world object in his/her surrounding has a content item tagged to or associated with it.

In some embodiments, by using Augmented Reality, users can "tag" objects with personal content such as photos, videos, or voice recordings. In some embodiments, the AR system can use image recognition and/or Global Positioning System (GPS) to detect objects in the physical world that have been "tagged" by other users. When a tagged object is detected, the system can render an alert over the object and allow the wearer or user of the AR device to review the information left in the tag (e.g., watch the video, view the photo, read the note, etc.). Tags can be shared based on "following" people through social networks. Tags can last forever, expire after a user selected amount of time, or be limited to a specific number of views (e.g., only after one person views the tag it is removed).

An example application of an embodiment of the present invention may include a user tagging his favorite baseball cap with a video of himself catching a home run ball. His friends encountering a similar hat could then see that it was tagged, and watch the video. As another example, a user tags the menu of his or her favorite restaurant with a voice note of the user's favorite items. Other users who see the menu can then hear their friend's recommendation. And as another example, a user tags a park bench with a childhood memory of having a picnic there. Other users later walking by could then participate in the nostalgic story.

Some embodiments of the present invention focus on using image recognition to provide a physical reference point for digital data, which allows alerts to be triggered based on a user's interaction with the real world. In some embodiments, to place a tag the user locates the desired object through an AR device, then chooses the type of tag (e.g., photo, video, audio, text, etc.) and composes the "post" (e.g., title, description, hashtags, etc.). When the AR system detects a tagged object in the real world, it can use any kind image overlay to alert the user and direct the user toward the information. In this way, some embodiments of the present invention can provide social interaction and/or information sharing through augmented reality.

Figure 1:
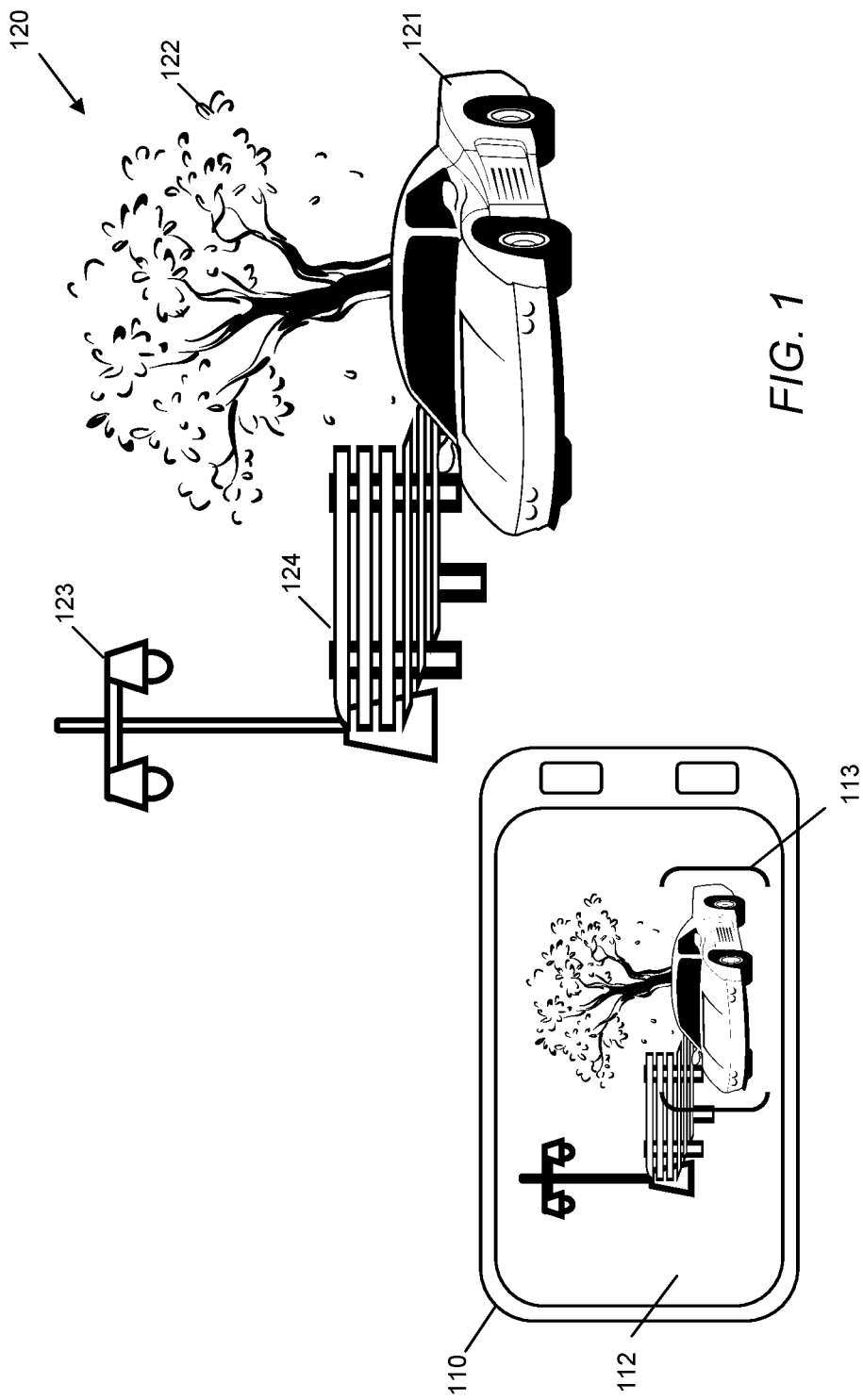
FIG. 1 is a diagram illustrating a device viewing a real-world scene in accordance with some embodiments of the present invention.

Referring to FIG. 1, there is illustrated a device viewing a real-world scene in accordance with some embodiments of the present invention. In FIG. 1, a user device 110 is used to view a real-world scene 120. The real-world scene 120 includes real-world objects such as a car 121, a tree 122, a lamppost 123, and a bench 124. The user device 110 may be a portable electronic device such as a Smartphone, a tablet computer, a mobile computer, a pad-like device, a head-mounted display, and/or a wearable device. The user device 110 includes a display screen 112 and other input/output devices such as a touch screen, a camera, a speaker, a microphone, a network adapter, a GPS sensor, a tilt sensor, etc. The display screen 112 may display an image of the real-world scene 120 as viewed by an image capture device of the user device 110 along with computer generated images to enable story telling via AR. For example, in FIG. 1, a bracket 113 is shown in the display screen 112 around an image of the car 121 to highlight the car 121. The user may select an object in the display screen 112 to interact with virtually. For example, the user may tag one of the objects with a content item or select an object to view content item(s) that has been tagged to it. Further details of methods for providing AR story telling are provided below with reference to FIGS. 2-8.

While FIG. 1 shows a user device 110 with a display screen 112 that reproduces an image of the real-world scene, in some embodiments, the user device 110 may include a transparent or translucent lenses such as those used in glasses-type and/or head-mounted display devices. With such devices, a user may view the real-world scene 120 directly through one or more lenses on the device, and the computer generate images are displayed in a way as to overlay the direct view of the real-world scene to produce a combined view similar to those shown in FIGS. 1 and 4-6.

Referring to FIG. 2, there is illustrated an example of a method 300 for virtually tagging a real-world object that operates in accordance with some embodiments of the present invention. In some embodiments, steps of method 300 may be performed by one or more server devices, a user device, or a combination of server and user devices.

In step 210, a user selection of a real-world object in a scene viewed by a camera of a first user device is received. The scene viewed by a camera of a user device may be an image captured in real-time or an image that was captured with a time delay. In some embodiments, a user selects an object by selecting a region of the image corresponding to the object. The system may use the image of the selected region for object recognition. In some embodiments, the user may select an object by zooming or framing the image of the real scene such that the object is the dominate object in the image. In some embodiments, the system may indicate, in the image of the real-world scene, objects that it automatically identifies through object recognition. For example, as shown in FIG. 1, the system may put a bracket around an identified object, in this case, a car 121, that the user can select. In some embodiments, the user may first select to a region of an image, and the system will then determine an object associated with the selected region of an image. For example, the user may touch the region above the image of the car 121, and the system may identify the tree 122 in that region. In some embodiments, the selected real-world object may be previously unknown to the system, and the system may isolate the object in the image by using image processing techniques such as edge detection. For example, the system may not recognize the lamppost 123 as a lamppost but is able to recognize it as a separate object based on edge detection. In some embodiments, the user may be prompted to enter attributes, such as name, model number, object type, object category, etc. to describe the object such that the system may "learn" of a previously unknown object.

In step 220, the system receives a content item to tag to, or associate with, the real-world object. The content item may be one or more of a text comment, an image, an audio clip, a video clip, a hyperlink, etc. The system may provide interfaces for a user to enter, upload, and/or capture the content item. For example, the system may provide a comment box and/or buttons to select a file to upload.

In step 230, one or more images of the real-world object are captured with the camera of the user device. The captured image may be later processed to determine additional information related to the selected object. The real-world object may be identified based on the shape, color, relative size, and other attributes of the object identifiable from an image of the real-world object. For example, the system may identify the car 121 as a car based on its shape and color. In some embodiments, the system my further identify other attributes of the object. For example, the system may identify the make, model, and model year of the car 121 based comparing the captured image to images in a known objects database. In some embodiments, the captured image may include specific identifying information of an object. For example, the image may include a license plate number of the car 121. In other examples, the captured image may include serial number or model number of electronic devices, unique identifier of limited edition of collectable items, etc.

In some embodiments, step 230 is performed automatically by the system without requiring user input. For example, the system may acquire one or more images of the real-world object when the user selects the object in step 210. In some embodiments, the system may prompt the user to take images of the real-world object. For example, if the object selected in step 210 is not one that is recognized by the system, the system may prompt the user to take images of the object from different angles so that it may be better matched with other images of the object. In some embodiments, after step 240, the system may prompt the user to capture additional images of the object based on the sharing settings. For example, if the user wants to tag the content item specifically to only the car 121 and not any other car that is similar in appearance, the system may ask for an image of unique identifying information, such as the car's license plate, if the license plate is not visible in the current view of the car.

Generally, the system may utilize variously known computer object recognition techniques to recognize objects in the image of the real-world scene. In some embodiments, object recognition may use appearance-based methods which compares an image with reference images of known objects to recognize an object. Examples of appearance-based methods include edge matching, grayscale matching, histograms of receptive field responses, etc. In some embodiments, object recognition may use feature-based methods that rely on matching object features and image features. Examples of feature-based methods include pose clustering, geometric hashing, scale invariant feature transform, interpretation trees, etc. The system may use one or more object recognition methods in combination to enhance the accuracy of object identification.

In step 240, sharing setting is received from the user. In some embodiments, the sharing setting includes whether the real-world object will be matched only with an image of the real-world object or with an image of any object sharing one or more common attributes with the real-world object. For example, if the user configures the sharing setting such that the real-world object will be matched only with an image of the specific real-world object, the system may determine and/or request the user to enter a unique identifier associated with the real-world image. The unique identifier may be based on a location of the object, a serial number the object, a license plate number, or other identifying text or image of the object. For example, the car 121 may be uniquely identified based on its license plate number and/or painted text or graphic on its body, the bench 124 and lamppost 123 may be uniquely identified based on their location information and/or an inscription, a baseball cap may be uniquely identified based on a signature on the cap or the locations of wear and tear on the cap, a trophy may be uniquely identified by the text on the trophy, etc. In some embodiments, the system may automatically determine these identifying attributes. For example, if the system detects a license a plate, name, or serial number in the image, the system may use that information as the identifying attribute. In another example, if the system recognizes the real-world object as a stationary object, such as the lamppost 123, a building, a statue, etc., the system may use the location of the object or the location of the device that captured the image as the identifying attribute. In some embodiments, the system may prompt the user to designate the identifying attribute. For example, the system may prompt the user to take a picture of or enter the serial number of an electronic device as the identifying attribute.

If the user selects to have the real-world object match with an image of any object having one or more common attributes with the real-world object, the system may prompt the user to select the matching attribute(s). Matching attributes refer to attributes that an object must have to be matched with a tagged object to receive content items tagged to the tagged object. In some embodiments, the matching attributes may be based on the appearance of the object, attributes of the object that are determined using image recognition, and/or the location of the object. For example, the user may configure the car 121 to match with any car, cars with the same color, cars by the same manufacturer, cars of the same model, or cars of the same model and model year, etc. While the color of the car may be determined based on the image alone, attributes such as the manufacturer of the car may be determined using image recognition. For example, the system may match the image of the car 121 with a reference image of a known car to determine the car's make, model, and model year. The common attribute can further be a location-based attribute. For example, the user may configure the bench 124 to match with any bench in the same park, any bench in the same city, any bench in a municipal park, any bench above a certain altitude, etc. Location attribute information of the real-world object may be determined based on the devices' GPS information and/or the location metadata information of the captured image of the real-world object.

In some embodiments, the system may perform image recognition and/or location analysis on the selected real-world object and present the user with a list of identified attributes for selection. The user can configure the sharing setting by selecting attributes used for matching the real-world object to another object from the list. For example, if the user selects the car 121 on the user device 110, the system may generate a list of attributes such as:

Object type: automobile
Color: gray
Make: DeLorean
Model: DMC-12
Model year: 1981
Location: Hill Valley, Calif.

The user may then select one or more of the identified attributes to configure the matching attributes in the sharing setting. For example, the user can select make and model as the matching attributes, and the content item tagged to the car 121 will only be matched to another image of a DeLorean DMC-12. In some embodiments, the user can manually enter attributes of the object to configure the sharing setting. For example, the user may configure the location-based sharing setting to be any location within 20 miles or 50 miles from Hill Valley, Calif., etc.

In some embodiments, the sharing settings further includes social network based sharing settings that controls who can view the content item tagged to the real-world object based on the user's social network connections. For example, the user can elect to share the content item to all "followers," only with friends, a selected group of users, or members of an existing group within a social network, etc.

While steps 220, 230, and 240 are shown sequentially in FIG. 2, in some embodiments, these steps can be performed in different orders. For example, in some embodiments, the user may configure the sharing setting prior to entering the content item to tag to the object. In some embodiments, one or more images of the real-world item may be captured prior to the content item being received or after the sharing setting is entered. In some embodiments, anytime during steps 220-240, the user may return to one of the previously performed steps to edit and/or enter information. In some embodiments, an object tagging user interface is provided to allow the user to perform two or more of steps 220, 230, and 240 in any order. In some embodiments, an image of the real-world object is captured when the user selects the real-world object in step 210. The system then determines whether more images are needed based on the received sharing settings in step 240, and prompt the user to capture one or more images as needed.

In step 250, the content item, the image of the real-world object, and the sharing setting entered in steps 220-240 are stored on a network accessible database such that the content item is configured to be retrieved by a second user device viewing an object matching the real-world object based on the sharing setting. Thus, in some embodiments, the content item is now said to be tagged to, or associated with, the real-world object. In some embodiments, the content item, the image of the real-world object, and the sharing setting are stored as they are entered in steps 220-240. In some embodiments, after step 250, the user may return to edit or delete the information entered in steps 210-240 using the user device and/or another user electronic device by logging into a user profile.

Referring to FIG. 3, there is illustrated an example of a method 300 that operates in accordance with some embodiments of the present invention. In some embodiments, steps of method 300 may be used to provide AR story telling as described herein. In some embodiments, method 300 may be performed by one or more server devices, a user device, or a combination of server and user devices.

In step 310, a real-world object in a scene viewed by a camera of a user device is identified based on image recognition. The system may utilize any known image recognition techniques. The scene viewed by a camera of a user device may be an image captured in real-time or an image that was captured with a time delay. In some embodiments, the user device uploads an image of the real-world scene to a server and the server identifies the real-world object(s) in the image. In some embodiments, the user device identifies attributes of the real-world object (such as color, gradient map, edge information) and uploads the attributes to the server to reduce network delay. The real-world object may be identified based on the shape, color, relative size, and other attributes of the object identifiable from an image of the real-world object. In some embodiments, object recognition may be based on multiple frames of a video image. In some embodiments, an object may be identified based in part on the GPS location of the user device when the image is captured. For example, the system may be able to distinguish two visually similar benches based on the location of the device. In some embodiments, in step 310, the system will attempt to identify all objects viewed by a camera of the user device.

In step 320, a real-world object is matched to a tagged object. The tagged object may be a real-world object tagged through the process shown in FIG. 2. As such, in some embodiments the tagged object has a content item associated with it. The matching in step 320 is based on the image recognition of the real-world object and the sharing setting of the tagged object. In some embodiments, the matching may be based on comparing the attributes of the real-world object with tagged objects in a tagged object database. For example, if the real-world object in step 310 is a red sports car, the real-world object may be matched with a tagged object designated to be matched with red cars, sports cars, etc, but would not be matched with a green sports car having a sharing setting that restricts sharing to only green cars. In some embodiments, the matching is also based on the social network sharing setting of the tagged object. For example, if a tagged object has been designated to only be shared with the author's "friends," and the user using the device to view the real-world object is not connected with the author of the content item in the social network service, then the real-world object would not be matched with that particular tagged object.

In some embodiments, the matching in step 320 may also be based on the location of the device viewing the real-world object. For example, if a tagged object has been configured to only be shared with items within a geographical region (GPS coordinate, address, neighborhood, city, etc.) that tagged object would not be matched with image of real-world objects taken outside of that region. In some embodiments, step 320 is performed for each object in a real-world scene identified in step 310.

In step 330, once a matching tagged object is found in step 320, a notification is provided to the user. The notification may be provided by one or more of a sound notification, a pop-up notification, a vibration, and an icon in a display of the scene viewed by the camera of the user device. For example, the system may cause a graphic indicator to appear on the screen to indicate to the user that an item in the real-world scene has been tagged. The graphic indicator may be an icon overlaying a view of the object, a bracket that surround the object, or a color/brightness change to highlight the object, etc. In some embodiments, if an object has been tagged with more than one content item, the notification may include an indicator for each content item. For example, if an item has been tagged by two different users or tagged with different type of content item, the graphic indicator may also indicate the author and/or content type for each content item.

In some embodiments, a notification may be provided based on location information alone, which then prompts the user to search for the tagged object in the surrounding. For example, if the system determines that there is a tagged object nearby based on matching the GPS coordinates of the device and the tagged object, the system may cause the device to vibrate or beep. The user may then point the camera of the device at surrounding objects to find a tagged object. The system may cause the graphic indicator to be displayed on the user device when the tagged object comes within the view of the camera.

In step 340, a request for the content item is received. The request may be generated by the user device when the user selects the real-world object and/or a graphical indicator in the user interface. For example, the user may tap an icon displayed on a touch screen of the user device to select a tagged object or a content item. In some embodiments, if an object has been tagged with multiple content items, the selection may include a selection of a content item and the request may include an indication for the specific content item. In some embodiments, the request may be generated by the user device automatically and the content item may be temporarily stored or cached on the user device. In some embodiments, the request may be required only for certain content item types. For example, the system may transmit text and image content items automatically upon detecting a tagged object, but stream audio and video type content items to the device only upon receiving a request from the user.

In step 350, a content item is provided to the user device. In some embodiments, all content items associated with a selected tagged object are provided to the user device. In some embodiments, only the selected content item is provided. In some embodiments, video and audio type content items are provided in a streaming format.

In some embodiments, after step 350, the viewing user may have the option to comment on the content item and/or the tagged object by providing his/her own content item.

Figure 4:
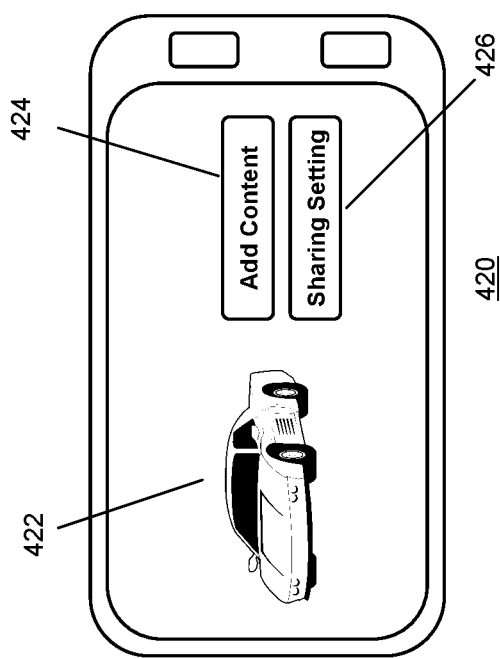
FIGS. 4-6 are screenshots illustrating user interfaces in accordance with some embodiments of the present invention.

Referring to FIG. 4, there is illustrated example screenshots of user interfaces for providing AR story telling. An object selection user interface 410 displays an image of a real-world scene viewed by a camera of the device, and may be used by a user to tag real-world objects with virtual content items. In some embodiments, the user can select a region of the real-world scene associated with an object. For example, a user may tap an area, draw a line around an area, and/or click and drag a rectangle around an area to select an area. In some embodiments, the system captures an image of the selected region and attempts to identify an object in the selected region. In some embodiments, the individual objects may be identified based on edge detection. In some embodiments, the system identifies one or more objects recognized by the system in the real-world scene to the user. For example, the system may overlay brackets 414 or other graphic indicators on the image of the real world scene. The graphic indicators may be selectable by the user.

After an object has been selected in the real-world scene view, a tagging user interface 420 may be displayed. The tagging user interface 420 may include an image 422 of the object selected to be tagged. The tagging user interface 420 may further include various options to enter and configured the content item. For example, the user may use an "add content" button 424 to enter or attach a text comment, an image, an audio file, and/or a video file. In some embodiments, the user interface also allows the user to record a new image, audio, and/or video to tag to the object without leaving the user interface and/or application. A user may use a "sharing setting" button 426 to configure various sharing settings discussed herein. For example, the use may select matching attributes, configure social network sharing setting, and/or enter location restrictions in the tagging user interface 420.

Figure 5:
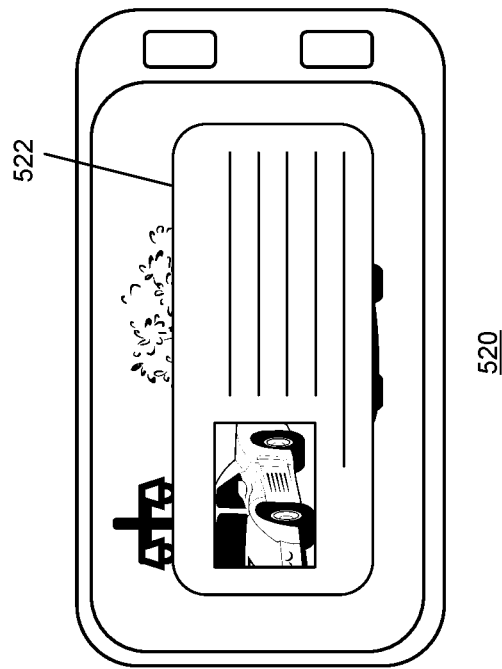
Figure 6:
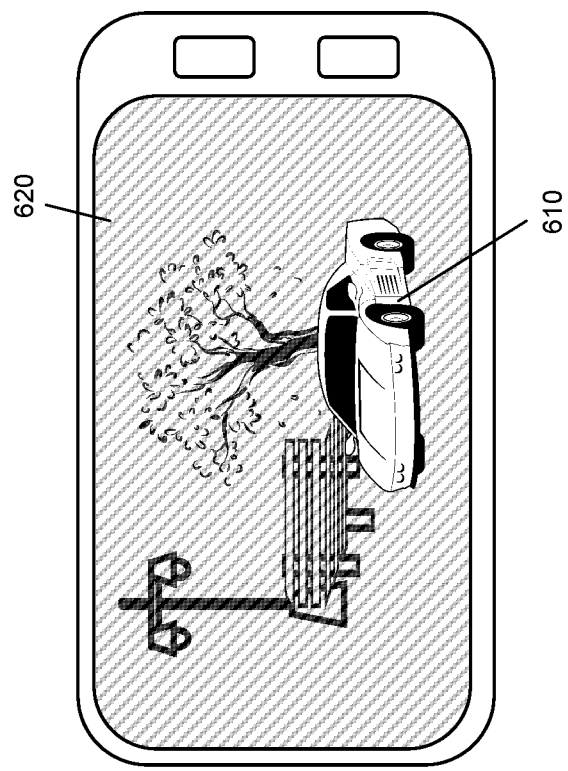

Referring to FIG. 5, there is illustrated additional example screenshots of user interfaces for providing AR story telling. A tagged object notification user interface 510 may be displayed to a user viewing a real-world scene through the user device. The tagged object notification user interface 510 may include one or more graphic indicators to identify tagged objects in the view of the real-world scene. For example, icon 512 indicates that the lamppost has been tagged with a text comment, icon 514 indicates that the bench has been tagged with an audio clip, and icon 516 indicates that the car has also been tagged with a text comment. In some embodiments, other types of graphical indicators are used to indicate that an object has a viewable content item. For example, a bracket similar to the bracket 414 in FIG. 4, an arrow, a blinking icon, an icon containing the profile image of the author of the content item, a thumbnail of the content item, etc. may be used. In some embodiments, the object or the surrounding's color and/or shading may be changed to distinguish a tagged object from its surrounding. For example, FIG. 6 shows a car 610 that is highlighted against the shaded background 620.

In some embodiments, the tagged object notification user interface 510 may be the same interface as the tagging user interface 410. For example, when the user opens a program or an application (or "app") on the user device, the user is presented with an image of the real-world scene viewed by the camera of the user device. If any of the objects in the real-world scene are tagged, a notification may be provided. The user may also select any object in the scene to virtually tag a new content item to the object.

When a tagged object or a content item is selected in the tagged object notification user interface 510, a content item viewing user interface 520 is shown. In the content item viewing user interface 520, the content item selected from the tagged object notification user interface 510 is retrieved and displayed to the user. The content may be displayed in full screen or as an overlay 522 of the image of the real world scene as shown in FIG. 5. The content item may include one or more of a text comment, an image, an audio clip, and a video clip. In some embodiments, if more than one content item is associated with a tagged object, multiple content items from different authors may be displayed at the same time.

The object selection user interface 410, the tagging user interface 420, the tagged object notification user interface 510, and the content item viewing user interface 520 may each be part of a program or application running on a user device and/or a server device. In some embodiments, the user interfaces may be parts of an app on a Smartphone that communicates with an AR server to provide the images and the contents of the user interfaces that enables AR storytelling. In some embodiments, the user interfaces are generated and provided entirely at the server.

Figure 7:
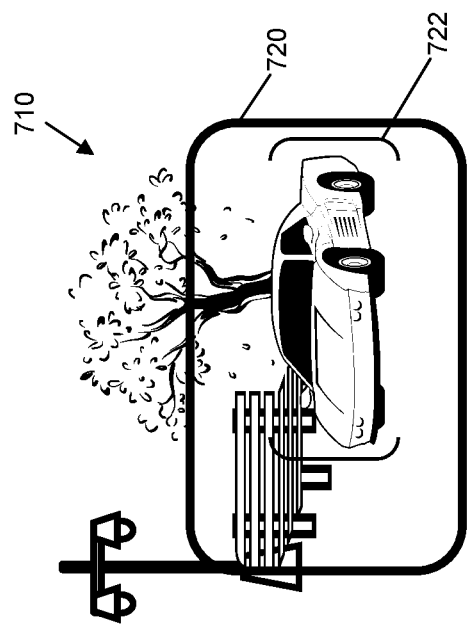
FIG. 7 is a diagram illustrating a device viewing a real-world scene in accordance with some embodiments of the present invention.

Referring to FIG. 7, there is illustrated a diagram showing a glasses-type user device viewing a real-world scene in accordance with some embodiments of the present invention. In some embodiments, the above described user interfaces may also be implemented with glasses-type and/or head-mounted type display devices. With such devices, a user may view the real-world 710 scene directly through a lens 720 on the device, and computer generated images 722 may be projected on the lens and/or wearer's eyes in a way as to overlay the direct view of the real-world scene to produce a combined view as shown in FIG. 7. The overlay images 722 may indicate a selected or selectable object for tagging and/or identify a tagged object as described herein. The user's selection of an object may be detected through eye gaze detection and/or voice command recognition. In some embodiments, the object may be selected through a touch pad on the device. For example, the user may slide over the touch pad to "scroll" through the selectable objects viewed through the lens of the device. In some embodiments, the user may add a text comment or an audio clip content item through spoken command received by a microphone of the head-mounted display. In some embodiments, selections can be made by gesturing in the view of the real-world scene which are captured and interpreted by a camera on the device. While only the frame of one lens is shown in FIG. 7, it is understood that the same principle applies to head-mounted devices with two lenses.

Figure 8:
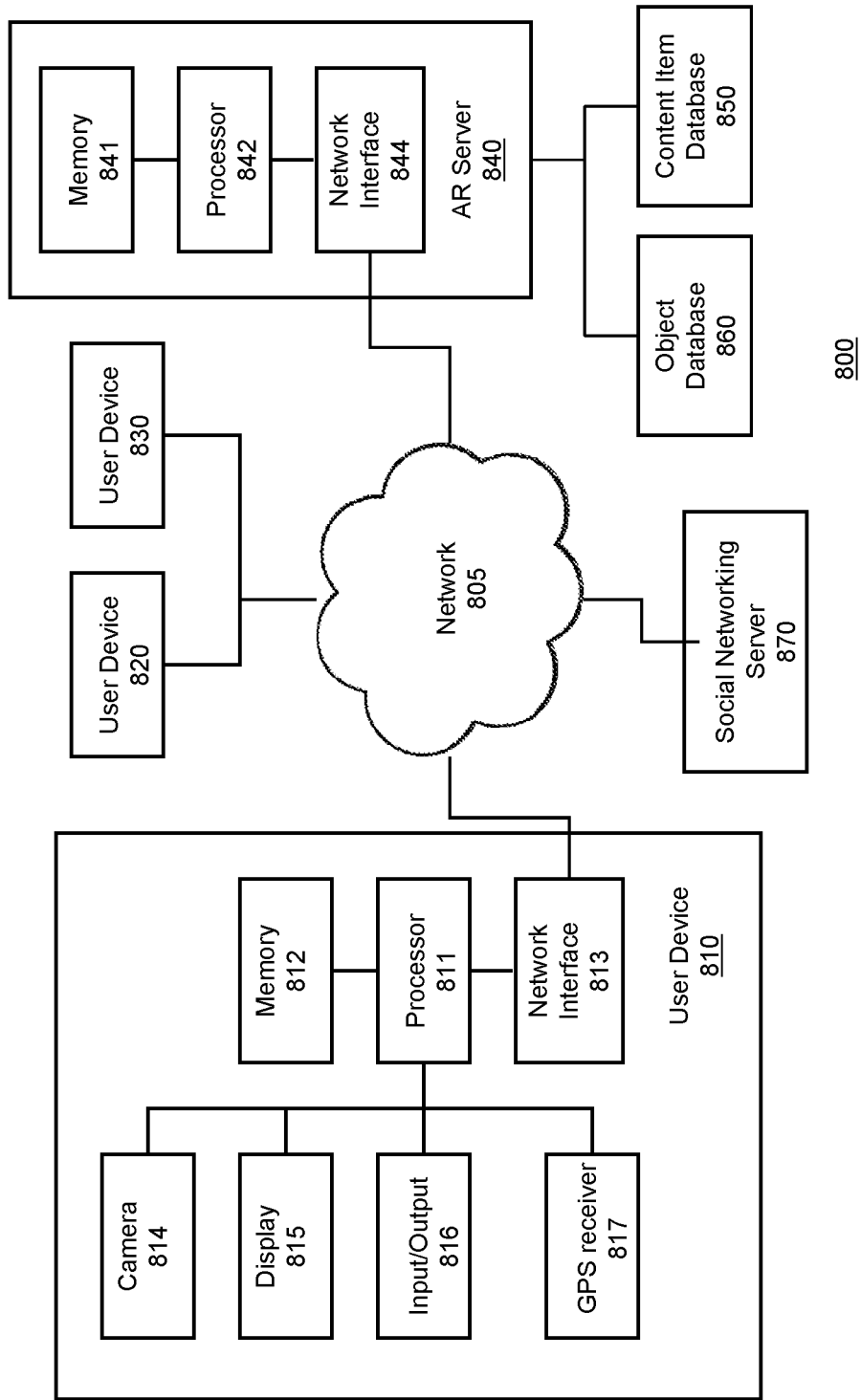
FIG. 8 is a block diagram illustrating a system that may be used to run, implement and/or execute any of the methods and techniques shown and described herein in accordance with the embodiments of the present invention.

FIG. 8 is a block diagram illustrating a system that may be used to run, implement and/or execute any of the methods and techniques shown and described herein in accordance with some embodiments of the present invention. The system 800 includes user devices 810, 820, and 830, an AR server 840, and a third party/social networking server 870 communicating over a network 805.

The user device 810 may be any portable user devices such as a Smartphone, a tablet computer, mobile computer or device, pad-like device, a head-mounted display, and/or a wearable device. The user device 810 may include a processor 811, a memory 812, a network interface 813, a camera 814, a display 815, one or more other input/output devices 816, and a GPS receiver 817. The processor 811 is configured to execute computer readable instructions stored in the memory 812 to facilitate one of more steps of the methods described with reference to FIGS. 2-3. The memory 812 may include RAM and/or a hard drive memory device. The network interface 813 is configured to transmit and receive data to and from at least the AR server 840 through the network 805. The camera 814 may be any image capture device. The display 815 may be a liquid crystal display (LCD), a light-emitting diode (LED) display, an organic light emitting diode (OLED) display, a liquid crystal on silicon (LCoS) display, a LED illuminated display, and the like. In some embodiments, the display 815 is a touch display that is configured to receive input from the user. In some embodiments, the display 815 is a head-mounted display that projects images to a lens or into the wear's eyes. The display may be used to display variously user interfaces described with reference to FIGS. 1-7 above. The GPS receiver 817 may be configured to detect GPS signals to determine a coordinate. The determined GPS coordinate can be used by the system 800 to determine the location of a device, an image, and/or an object. The user device 810 may further include other input/output devices 816 such as a microphone, a speaker, a tilt sensor, a compass, a USB port, a secondary camera, a graphic processor, etc. The input/output devices 816 may be used to enter and playback content items. In some embodiments, the tilt sensor and the compass are used by the system to better position the computer generated graphics over the image of the real-world scene, in addition image recognition.

User devices 820 and 830 may be user devices similar to user device 810 and may be operated by one or more other users to access the AR story telling system 800. It is understood that while three user devices are shown in FIG. 8, the system 800 may be accessed by any number of users and user devices.

The AR server 840 includes a processor 842, a memory 841, and a network interface 844. The processor 842 is configured to execute computer readable instructions stored in the memory 841 to perform one or more steps described herein with reference to FIGS. 2-3. The AR server 840 may be connected to or include one or more of an object database 860 and a content item database 850. The content item database 850 may store information relating to each of the tagged real-world objects, content item(s) tagged to each object, and the sharing settings associated with the content item and/or tagged object. In some embodiments, step 250 in FIG. 2 is performed by storing the information into the content item database 850. The object database 860 may include a database of known objects used by the object recognition algorithm of the system to identify one or more real-world objects and their attributes. In some embodiments, image(s) of the real-world object taken by the camera 814 of the user device 810 is compared to one or more images of objects in the object database 860. When there is a match, the object database 860 may provide further information relating to the object, such as object name, object type, object model, etc.

In some embodiments, one or more of the object database 860 and the content item database 850 may be part of the AR server 840. In some embodiments, the object database 860 and the content item database 850 may be implemented as a single database. In some embodiments, the AR server 840 communicates with one or more of the object database 860 and the content item database 850 also via the network 805. In some embodiments, the object database 860 may be maintained and controlled by a third party.

In some embodiments, the object database 860 may "learn" new objects by receiving user provided images and attributes, and adding the user provided information to its database. For example, when a user takes a picture of a car and enters its make and model, the object database may subsequently be able to recognize another image of the same car and be able to provide information on its make and model. While only one AR server 840 is shown, it is understood that the AR server 840, the object database 860, and content item database 850 may be implemented with one or more physical devices connected through a network.

The social networking server 870 provides social networking functions for users to connect to each other and build social networks and groups. The social networking server 870 may be part of the AR server 840 or a third party service. The connections and groups built in the social networking service may be used to configure the sharing setting discussed herein. For example, if a content item is configured to be shared only with "friends" of the author, the AR server 840 may query the social networking server 870 for the social networking status between two users to determine whether a content item should be provided to a second user. In some embodiments, when a user is configuring sharing settings, information can be retrieved from the social networking server 870 such that the user can select among his/her friends and/or social groups to share the content item.

In some embodiments, one or more of the embodiments, methods, approaches, and/or techniques described above may be implemented in one or more computer programs or software applications executable by a processor based apparatus or system. By way of example, such processor based system may comprise the processor based apparatus or system 800, or a computer, entertainment system, game console, graphics workstation, server, client, portable device, pad-like device, etc. Such computer program(s) may be used for executing various steps and/or features of the above-described methods and/or techniques. That is, the computer program(s) may be adapted to cause or configure a processor based apparatus or system to execute and achieve the functions described above. For example, such computer program(s) may be used for implementing any embodiment of the above-described methods, steps, techniques, or features. As another example, such computer program(s) may be used for implementing any type of tool or similar utility that uses any one or more of the above described embodiments, methods, approaches, and/or techniques. In some embodiments, program code macros, modules, loops, subroutines, calls, etc., within or without the computer program(s) may be used for executing various steps and/or features of the above-described methods and/or techniques. In some embodiments, the computer program(s) may be stored or embodied on a computer readable storage or recording medium or media, such as any of the computer readable storage or recording medium or media described herein.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides one or more non-transitory computer readable storage mediums storing one or more computer programs adapted to cause a processor based apparatus or system to execute steps comprising: identifying a real-world object in a scene viewed by a camera of a user device; matching the real-world object with a tagged object based at least in part on image recognition and a sharing setting of the tagged object, the tagged object having been tagged with a content item; providing a notification to a user of the user device that the content item is associated with the real-world object; receiving a request from the user for the content item; and providing the content item to the user. In another example, in some embodiments the present invention provides one or more non-transitory computer readable storage mediums storing one or more computer programs adapted to cause a processor based apparatus or system to execute steps comprising: receiving a selection of a real-world object as viewed by a camera of a first user device from a user; receiving a content item to tag to the real-world object; capturing one or more images of the real-world object with the camera; receiving a sharing setting from the user, wherein the sharing setting comprises whether the real-world object will be matched only with an image of the real-world object or with an image of any object sharing one or more common attributes with the real-world object; and storing the content item, the one or more images of the real-world object, and the sharing setting on a server, wherein the content item is configured to be retrieved by a second user device viewing an object matching the real-world object.

While the invention herein disclosed has been described by means of specific embodiments and applications thereof, numerous modifications and variations could be made thereto by those skilled in the art without departing from the scope of the invention set forth in the claims.

What is claimed is:

1. A method comprising:
   identifying a real-world object in a scene that is being viewed by a camera of a user device;
   while the scene is being viewed by the camera of the user device, matching the real-world object with a tagged object based at least in part on image recognition and a sharing setting of the tagged object, the tagged object having been tagged with a content item;
   while the scene is being viewed by the camera of the user device, providing a notification to a user of the user device that the content item is associated with the real-world object;
   receiving a request from the user for the content item; and providing the content item to the user.

2. The method of claim 1, wherein the sharing setting comprises whether the tagged object will be matched only with an image of the tagged object or with an image of any object sharing one or more common attributes with the tagged object.

3. The method of claim 1, wherein the matching of the real-world object with the tagged object is further based on a location of the user device and/or a social network connection between the user and an author of the content item.

4. The method of claim 1, wherein the notification comprises one or more of a sound notification, a pop-up notification, a vibration, or an icon in a display of the scene viewed by the camera of the user device.

5. The method of claim 1, wherein the content item comprises one or more of a text comment, an image, an audio clip, or a video clip.

6. An apparatus comprising:
   a processor-based device; and
   a non-transitory storage medium storing a set of computer readable instructions configured to cause the processor-based device to perform steps comprising:
   identifying a real-world object in a scene that is being viewed by a camera of a user device;
   while the scene is being viewed by the camera of the user device, matching the real-world object with a tagged object based at least in part on image recognition and a sharing setting of the tagged object, the tagged object having been tagged with a content item;
   while the scene is being viewed by the camera of the user device, providing a notification to a user of the user device that the content item is associated with the real-world object;
   receiving a request from the user for the content item; and providing the content item to the user.

7. The apparatus of claim 6, wherein the sharing setting comprises whether the tagged object will be matched only with an image of the tagged object or with an image of any object sharing one or more common attributes with the tagged object.

8. The apparatus of claim 6, wherein the matching of the identified real-world object with the tagged object is further based on a location of the user device and/or a social network connection between the user and an author of the content item.

9. The apparatus of claim 6, wherein the notification comprises one or more of a sound notification, a pop-up notification, a vibration, or an icon in a display of the scene viewed by the camera of the user device.

10. The apparatus of claim 6, wherein the content item comprises one or more of a text comment, an image, an audio clip, or a video clip.

11. A method comprising:
    receiving a selection of a real-world object while the real-world object is being viewed by a camera of a first user device from a user;
    while the real-world object is being displayed on a display of the first user device, receiving a content item to tag to the real-world object;
    capturing one or more images of the real-world object with the camera;

while the real-world object is being displayed on the display of the first user device, receiving a sharing setting from the user, wherein the sharing setting comprises whether the real-world object will be matched only with an image of the real-world object or with an image of any object sharing one or more common attributes with the real-world object; and storing the content item, the one or more images of the real-world object, and the sharing setting on a server, wherein the content item is configured to be retrieved by a second user device viewing an object matching the real-world object.

12. The method of claim 11, wherein the content item comprises one or more of a text comment, an image, an audio clip, or a video clip.

13. The method of claim 11, wherein the sharing setting further comprises restrictions on who can view the content item.

14. The method of claim 11, wherein the sharing setting is entered by the user selecting from a list of attributes corresponding to the real-world object.

15. The method of claim 14, wherein the list of attributes is generated through object recognition performed on the one or more images of the real-world object.

16. An apparatus comprising:
a processor-based device; and
a non-transitory storage medium storing a set of computer readable instructions configured to cause the processor-based device to perform steps comprising:
receiving a selection of a real-world object while the real-world object is being viewed by a camera of a first user device from a user;
while the real-world object is being displayed on a display of the first user device, receiving a content item to tag to the real-world object;
capturing one or more images of the real-world object with the camera;
while the real-world object is being displayed on the display of the first user device, receiving a sharing setting from the user, wherein the sharing setting comprises whether the real-world object will be matched only with an image of the real-world object or with an image of any object sharing one or more common attributes with the real-world object; and
storing the content item, the one or more images of the real-world object, and the sharing setting on a server, wherein the content item is configured to be retrieved by a second user device viewing an object matching the real-world object.

17. The apparatus of claim 16, wherein the content item comprises one or more of a text comment, an image, an audio clip, or a video clip.

18. The apparatus of claim 16, wherein the sharing setting further comprises restrictions on who can view the content item.

19. The apparatus of claim 16, wherein the sharing setting is entered by the user selecting from a list of attributes corresponding to the real-world object.

20. The apparatus of claim 19, wherein the list of attributes is generated through automatic object recognition performed on the one or more images of the real-world object.

* * * * *